United States Patent
Kepecs (10) Patent No.: US 8,000,998 B2
(45) Date of Patent: Aug. 16, 2011

(54) SYSTEM AND METHOD FOR INVERTED PROMOTIONS

(75) Inventor: Jonathan Kepecs, Woodside, CA (US)

(73) Assignee: DS-IQ, Inc., Bellevue, WA (US)

(*) Notice: Subject to any disclaimer, the term of this patent is extended or adjusted under 35 U.S.C. 154(b) by 1395 days.

(21) Appl. No.: 10/458,029

(22) Filed: Jun. 9, 2003

(65) Prior Publication Data

US 2003/0212599 A1 Nov. 13, 2003

Related U.S. Application Data

(60) Division of application No. 09/558,945, filed on Apr. 26, 2000, now Pat. No. 7,225,143, which is a continuation-in-part of application No. 09/303,077, filed on Apr. 30, 1999, now Pat. No. 6,389,401.

(51) Int. Cl.
*G06Q 30/00* (2006.01)
(52) U.S. Cl. ............................................. 705/14.38
(58) Field of Classification Search ............... 705/14
See application file for complete search history.

(56) References Cited

U.S. PATENT DOCUMENTS

| | | | |
|---|---|---|---|
| 4,554,446 A | 11/1985 | Murphy et al. |
| 4,723,212 A | 2/1988 | Mindrum et al. |
| 4,817,043 A | 3/1989 | Brown |
| 4,825,045 A | 4/1989 | Humble |
| 4,882,675 A | 11/1989 | Nichtberger et al. |
| 4,896,791 A | 1/1990 | Smith |
| 4,910,672 A | 3/1990 | Off et al. |
| 4,941,090 A | 7/1990 | McCarthy |
| 4,949,256 A | 8/1990 | Humble |
| 4,982,346 A | 1/1991 | Girouard et al. |
| 5,039,848 A | 8/1991 | Stoken |
| 5,056,019 A | 10/1991 | Schultz et al. |
| 5,117,355 A | 5/1992 | McCarthy |
| 5,173,851 A | 12/1992 | Off et al. |

(Continued)

FOREIGN PATENT DOCUMENTS

AU 755875 4/2003

(Continued)

OTHER PUBLICATIONS

"Banyan Joins the Vultures Picking Over the 3+, 3+ Open Corpse," *Computergram International*, Nov. 5, 1992.

(Continued)

*Primary Examiner* — John G Weiss
*Assistant Examiner* — M Hamilton
(74) *Attorney, Agent, or Firm* — Aka Chan LLP (57) ABSTRACT

A method of extending promotional discounts and special prices on items for sale to identified consumers. After the identification of a consumer by a unique identifier; a selected item is promoted with a discount or special price to the identified consumer. The discount or special price is granted upon a purchase of the item by the identified consumer prior to the withdrawal or termination of the promotion to the identified consumer. The withdrawal or termination of the promotion is held in abeyance upon an acknowledgment of the promotion by the identified consumer. In other words, the identified consumer must take specific action to prevent a promotional discount from being withdrawn. This inverted promotion provides for greater incentives for the consumer to provide information about his or her purchasing habits.

25 Claims, 2 Drawing Sheets

U.S. PATENT DOCUMENTS

| | | | |
|---|---|---|---|
| 5,185,695 | A | 2/1993 | Pruchnicki |
| 5,201,010 | A | 4/1993 | Deaton et al. |
| 5,231,568 | A | 7/1993 | Cohen et al. |
| 5,305,195 | A | 4/1994 | Murphy |
| 5,373,440 | A | 12/1994 | Cohen et al. |
| 5,380,991 | A | 1/1995 | Valencia et al. |
| RE34,915 | E | 4/1995 | Nichtberger et al. |
| 5,420,606 | A | 5/1995 | Begum et al. |
| 5,430,644 | A | 7/1995 | Deaton et al. |
| 5,448,471 | A | 9/1995 | Deaton et al. |
| 5,459,306 | A | 10/1995 | Stein et al. |
| 5,467,269 | A | 11/1995 | Flaten |
| 5,612,868 | A | 3/1997 | Off et al. |
| 5,638,457 | A | 6/1997 | Deaton et al. |
| 5,687,322 | A | 11/1997 | Deaton et al. |
| 5,708,782 | A | 1/1998 | Larson et al. |
| 5,710,886 | A | 1/1998 | Christensen et al. |
| 5,710,887 | A | 1/1998 | Chelliah et al. |
| 5,717,866 | A | 2/1998 | Naftzger |
| 5,761,648 | A | 6/1998 | Golden et al. |
| 5,832,457 | A | 11/1998 | O'Brien et al. |
| 5,855,007 | A | 12/1998 | Jovicic et al. |
| 5,857,175 | A * | 1/1999 | Day et al. ........................ 705/14 |
| 5,903,874 | A | 5/1999 | Leonard et al. |
| 5,905,246 | A * | 5/1999 | Fajkowski ..................... 235/375 |
| 5,907,830 | A | 5/1999 | Engel et al. |
| 5,909,023 | A | 6/1999 | Ono et al. |
| 5,923,016 | A | 7/1999 | Fredregill et al. |
| 5,924,080 | A | 7/1999 | Johnson |
| 5,956,694 | A | 9/1999 | Powell |
| 5,970,124 | A | 10/1999 | Csaszar et al. |
| 5,970,469 | A | 10/1999 | Scroggie et al. |
| 5,970,470 | A | 10/1999 | Walker et al. |
| 5,974,399 | A | 10/1999 | Giuliani et al. |
| 6,009,411 | A | 12/1999 | Kepecs |
| 6,014,634 | A | 1/2000 | Scroggie et al. |
| 6,014,638 | A | 1/2000 | Burge et al. |
| 6,026,370 | A | 2/2000 | Jermyn |
| 6,029,139 | A | 2/2000 | Cunningham et al. |
| 6,039,244 | A | 3/2000 | Finsterwald |
| 6,044,362 | A | 3/2000 | Neely |
| 6,055,573 | A | 4/2000 | Gardenswartz et al. |
| 6,076,068 | A | 6/2000 | DeLapa et al. |
| 6,076,071 | A | 6/2000 | Freeny, Jr. |
| 6,115,693 | A | 9/2000 | McDonough et al. |
| 6,134,534 | A | 10/2000 | Walker et al. |
| 6,185,541 | B1 | 2/2001 | Scroggie et al. |
| 6,237,145 | B1 | 5/2001 | Narasimhan et al. |
| 6,330,543 | B1 | 12/2001 | Kepecs |
| 6,389,401 | B1 | 5/2002 | Kepecs |
| 6,564,189 | B1 * | 5/2003 | Nycz ............................... 705/20 |
| 2002/0062254 | A1 * | 5/2002 | Matsko ........................... 705/20 |
| 2004/0200898 | A1 | 10/2004 | Kepecs |
| 2004/0230483 | A1 | 11/2004 | Kepecs |

FOREIGN PATENT DOCUMENTS

| | | |
|---|---|---|
| EP | 1029302 | 8/2000 |
| EP | 1192573 | 4/2002 |
| JP | 407065242 A | 3/1995 |
| JP | 408161635 A | 6/1996 |
| WO | WO 85/01373 A1 | 3/1985 |
| WO | WO 92/14213 | 8/1992 |
| WO | WO 92/20030 | 11/1992 |
| WO | WO 93/16443 | 8/1993 |
| WO | WO 94/09440 | 4/1994 |
| WO | WO 95/21428 A1 | 8/1995 |
| WO | WO 97/23838 | 7/1997 |
| WO | WO 97/30409 | 8/1997 |
| WO | WO 98/38589 | 3/1998 |
| WO | WO 99/12115 A1 | 3/1999 |
| WO | WO 99/26176 A1 | 5/1999 |
| WO | WO 00/41115 A1 | 7/2000 |
| WO | WO 00/67174 A1 | 11/2000 |
| WO | WO 01/46892 A1 | 6/2001 |
| ZA | 98/10678 | 10/1999 |

OTHER PUBLICATIONS

"Intellipost Launches BonusMail With 50,000 Charter Members," Byline: Business Editors/Computer Writers, Jun. 1997.

Kremer, J., "Mail Order Selling Made Easier," Ad-Lib Publications, pp. 75-79 (1983).

"World's First Smart Card Frequent Flyer Scheme Debuts," Newbyte News Network, Sep. 1997.

Beck, J., "3 Types of Systems Drive Coupon Programs," *Supermarket News*, 37:48 (1987).

Brown et al., "Are Profits Deserved?," *J. Bus. Ethics*, 11(2):105-114 (1992).

Taylor, S: "Don't Become Confined by The Box," *Advertising Age*, 68:26 (1997).

PR Newswire, "Caldor Announces Agreement with New York State Attorney General," Jan. 11, 1993.

* cited by examiner

SYSTEM AND METHOD FOR INVERTED PROMOTIONS

CROSS-REFERENCES TO RELATED APPLICATIONS

This application claims priority from and is a divisional application of U.S. application Ser. No. 09/558,945, filed Apr. 26, 2000, which in turn is a continuation-in-part of U.S. application Ser. No. 09/303,077, filed Apr. 30, 1999, and which issued as U.S. Pat. No. 6,389,401 B1. The entire contents of U.S. application Ser. No. 09/558,945 and U.S. application Ser. No. 09/303,077 are incorporated herein by reference for all purposes.

BACKGROUND OF THE INVENTION

The present invention relates generally to discounting and promotion of goods and services to consumers, and, more particularly, to the electronic distribution of promotions, such as discounts, rebates and special prices for goods and services.

Heretofore, consumer discounts on specific goods or services have been in the form of physical tokens or coupons by which a consumer can obtain a discount on the price of a good or a service by redeeming the token or coupon. For instance, paper coupons are often distributed with newspapers, or by blanket mailing to residents of a neighborhood or region. More recent forms of coupon distribution have attempted to better target the potential purchasers of particular items. For example, coupons are printed on the back of store purchase receipts, such as those at supermarkets, so that the coupons target those who actively shop. Another form of coupon distribution targets the purchasers of particular items. When a sale of a particular item is entered on a Universal Product Code (UPC) reader at a store, such as a supermarket, a coupon for the same item or family of items may be created for the purchaser to ensure brand loyalty. Alternatively, the coupon may be for a competing brand to encourage "brand-switching."

Another promotion incentive to consumers is to offer special pricing on items. This is attractive to the retailer since the retailer can receive some economic benefit from the special pricing. Benefit to the manufacturer may also accrue, but only after consideration of the retailer's benefit. Though the profit may be less for the sale of the item, the retailer might receive repeat business, for example, from a satisfied customer. In the case of manufacturer coupons, the retailer receives no direct economic benefit. The retailer is reimbursed the face value of a redeemed coupon plus a small fee to compensate for the costs of processing the coupon and for advancing the cash value on the coupon to the consumer.

Ideally, a database of all consumers' transactions would allow the precise targeting of advertisements, discounts, or special prices, being a form of advertisement, to individual consumers. The effectiveness of consumer targeting would be maximized so that promotion money is spent where it is effective and not spent when it is ineffective. To that end, producers and retailers have used emerging technologies to identify consumers and their purchasing interests. Hence, much of the modern promotion efforts have been directed as much toward gathering consumer information, as well as encouraging the purchase of specific items. Surveys using modern polling techniques have helped create such consumer databases, and computers have been used to correlate buying patterns of customers through store loyalty cards, for example. However, such consumer identification remains elusive and expensive, and the targeting of consumers remains difficult and costly.

Up to now, promotion efforts have required the consumer to take a specific action to enable his or her discounts on a product or service. For instance, the consumer is required to bring in a paper coupon or token for redemption. In a modern supermarket, the consumer must make one or more selections at a kiosk or web site, bring in a paper coupon or token, or make a specific purchase that triggers a coupon or token to be printed or otherwise issued to enable his discount at the checkout counter. In contrast, the present invention inverts the promotion via predetermination without explicit selection so as to invite more participation from the consumer. As a result, the consumer's response to the incentive contributes more consumer information.

SUMMARY OF THE INVENTION

The present invention provides for a method of extending promotional discounts on items for sale to consumers. The method includes identifying a consumer by a unique identifier; promoting a selected item with a discount or special price to the identified consumer; withdrawing the discount to the identified consumer; granting the discount or special price upon purchase of the item by the identified consumer prior to the withdrawing step; and holding the withdrawing step in abeyance upon an acknowledgment of the promoting step by the identified consumer. Stated differently, the identified consumer must take specific action to prevent a promotional discount from being withdrawn. By doing so, the present invention provides for greater incentives for the consumer to provide information about his or her purchasing habits.

DESCRIPTION OF THE SPECIFIC EMBODIMENTS

The promotion of, distribution of, and payment for, goods in a modern society is complex. Broadly stated, the producer manufactures the goods, the retailer sells the goods, and the consumer purchases the goods. There is often a financial institution which supplies credit, for example, through a credit card, or which administers some other non-cash payment system, for example, through a debit card or a so-called smart card, for the consumer to purchase the goods. To compete in the marketplace, the producer and the retailer employ advertising and promotions, including discounts, e.g., coupons, to encourage consumers to purchase their goods.

The effective targeting of consumers has become more urgent from the increased level of competition for customers today. This is especially true for the retailer that has been traditionally located near the consumer. Such retailers face mounting competition not only from other traditional retailers, but also from mail-order retailers and, more recently, the so-called "e-commerce" operators on the Internet, specifically the Worldwide Web.

The present invention provides for promotions in the context of unique consumer identifiers, some of which are in common use today. For example, a consumer's name and mailing address have been used as consumer identifiers for many years. Recently, retail stores, especially chains of retail stores, have started to offer loyalty cards which reward shoppers for frequenting the store(s) covered by the loyalty card. Stores generally request customer information (such as name and mailing address) and assign the customer a unique (to the store or chain) number for identification purposes. Besides loyalty card accounts, other consumer identifiers are account numbers for credit cards, debit cards, and smart cards. Even personal checks, telephone numbers, Social Security numbers and driver's license numbers provide unique identifiers of consumers. In the future, biometric information may provide consumer identification.

It should noted that while the unique consumer identifiers above do effectively identify the person of the consumer, a unique consumer identifier, such as described in U.S. application Ser. No. 09/191,591, now U.S. Pat. No. 6,009,411, entitled "METHOD AND SYSTEM FOR DISTRIBUTING AND RECONCILING ELECTRONIC PROMOTIONS," and filed Nov. 13, 1998 by Jonathan Kepecs and assigned to the present assignee, which application is hereby incorporated by reference, is also applicable to the present invention. That application describes a system by which an account number, termed the KEY, can be used to uniquely identify a consumer for purposes of creating a consumer database. The KEY may be isolated from other account numbers which can be used to identify the person of the consumer to preserve the person's privacy. This type of isolated account number to identify the consumer provides for a limited direct identification. In fact, the aforementioned loyalty card accounts also provide for a limited directed identification of consumers to the extent that stores are not strict in assuring the accuracy of consumer information associated with the loyalty card account number. Many of the advantages of the present invention are still available with only a limited direct identification of the consumer.

In any case, promotions are made with the expectation that more consumer information will be forthcoming in return for the discount. If a purchase of an item can be connected to a consumer, that transaction becomes part of the consumer's database. The present invention places the promotion in such terms so as to increase the likelihood of consumer participation and the addition of more consumer information by "inverting" the promotion. Rather than requiring the consumer to act upon the offered promotion to obtain the discount, the present invention inverts this process. The promotion discount may be withdrawn unless the consumer acts.

The present invention is readily adaptable to traditional and more modern vehicles of promotion. The determination is first made to offer selected discounts, or more broadly stated, special prices, on one or more selected items to selected consumers. Note that a special price might include a free sample or a reduction in price on a collection of items, such as an entire shopping basket of goods. The determination can be made by human decision based upon analysis of broad consumer trends, or automatically by software which utilizes the consumer transaction database for the identification of specific consumers (albeit by limited direct identification in the case of some consumers), the costs of sales, inventory data, expert knowledge about specific buying patterns, inferred knowledge based on collections of related buying behavior and other factors. If the entity making the promotion is a retailer, the other factors include any promotional incentives from manufacturers of the items that may be synergistic with the promotions offered by retailers. The results of the determination includes what items to promote, the timing of the promotion, the duration and conditions for the promotion. For example, there may be a limit of one item to a specific consumer. The promotion may expire after one week, or after one month if the targeted consumer buys no products related to the specific item. Note that with computer software, it is possible to make the promotion specific to each consumer.

Besides inverted promotions to specific consumers, inverted promotions to specific households can also be made if there is more information about the consumers than limited direct identifications as described above. For example, if the name and addresses of some consumers are known, then consumers with a common last name and address might be treated as an economic unit. In promotions directed toward the individual consumers of an inferred household, the individual consumers receive promotions of specific items which other members of the inferred household have bought or might buy, or which belong to the category of household items, such as cleaners, paper towels and the like. The individual consumer still receives promotions of items based on his or her own buying patterns also.

The inverted promotion offer grants a discount upon purchase of the selected item by the selected consumer. A notice of the offer may be posted in a number of ways. The notification may be simply mailed to the selected customer by postal service. (Note that in this case, there is a direct identification of the consumer.) The notification may be sent by e-mail, or simply posted on a webpage or an in-store kiosk for access by the selected consumer. Alternatively, the notification may be posted on a network with an automated telephone attendant to answer inquiries from consumers about such promotions.

Termination or withdrawal of the promotion might occur after a predetermined period, or might be for any reason, or completely arbitrary. Note that unless the promotion is terminated, the consumer receives the benefits of the promotion anyway. If the consumer unknowingly purchases the selected item(s) before the offer is withdrawn, for instance, the discount or special price applies. Hence, where the notification of the inverted promotion takes some time to reach the consumer, the effectiveness of the promotion might be delayed for a time equal to the time the notification is to reach the consumer. For example, if the notification is sent by regular mail to the consumer, the effectiveness of promotion might be delayed three days, the time expected for the mailed notification to reach the consumer. The delay prevents the consumer from inadvertently receiving the benefits of the promotion without a chance to act upon the notification.

The present invention encourages the selected consumer to respond to the promotion so that more consumer information can be collected. Further encouragement for the consumer to be responsive to the notification of the promotion can be created by notifying the unresponsive consumer of the termination or withdrawal of the promotion. Any notification of the end of the promotion is transmitted at the time of the promotion termination. Alternatively, no notification need be sent if the consumer is warned in advance of the promotion's automatic withdrawal. Typically the termination notification is sent by the same means as used for the transmission of the promotion notification, though another means might be used. Of course, if it is found that the inverted promotion to a particular consumer is ineffective, it can be simply terminated. For example, the notification of the inverted promotion may be by a website posting, as explained below, and the desired response is an acknowledgment by the consumer through the website. If there is no such response or if the consumer appears to be receiving the benefits of the promotion on a random basis (possibly not even visiting the communication channels that convey the inverted promotion notifications to the consumer), the inverted promotion to that consumer is terminated.

Figure 1:
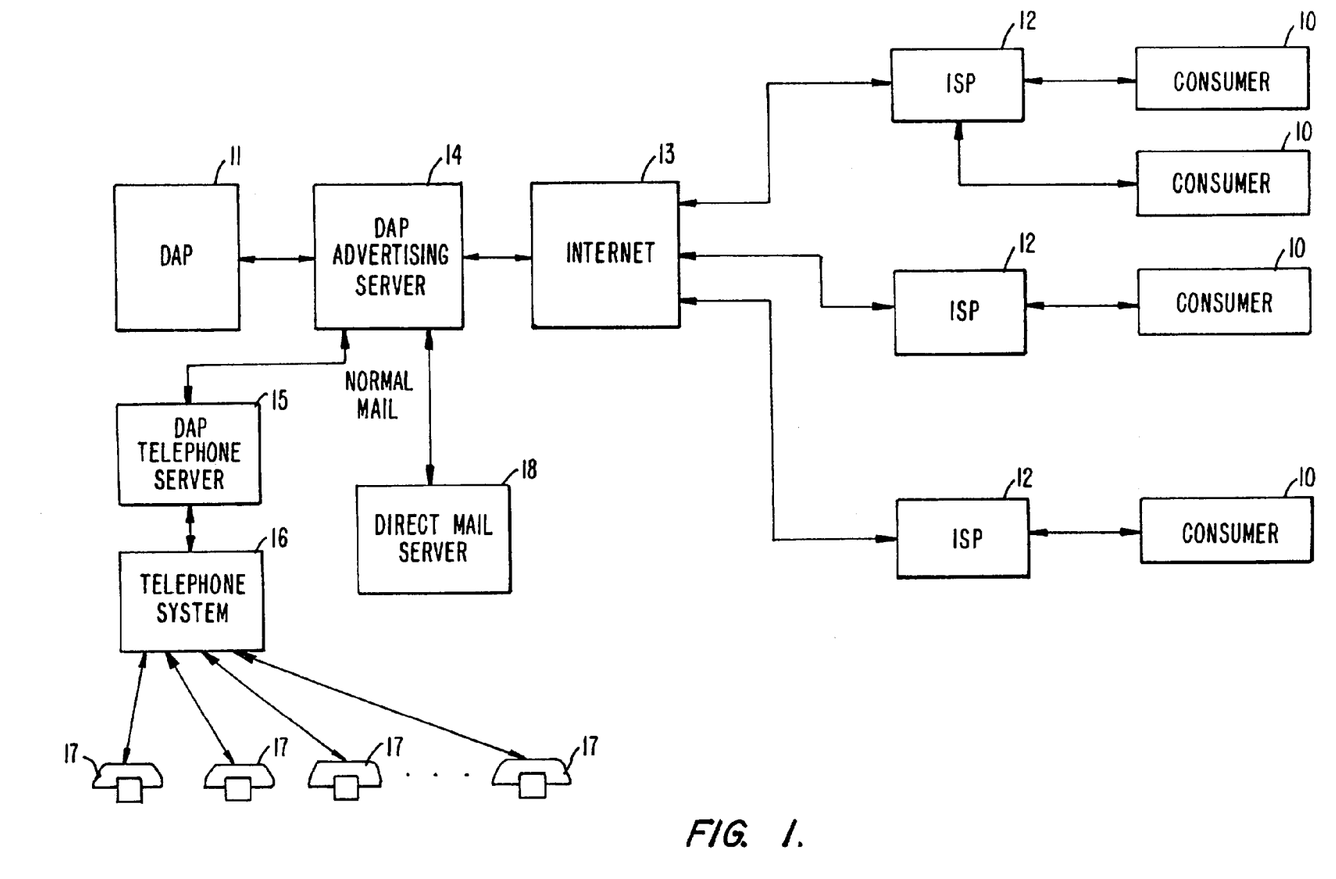
FIG. 1 is a block diagram of a computer network for providing promotional offers to consumers and receiving responses from them, according to the present invention.

FIG. 1 illustrates an electronic promotion link that might be used to carry out the present invention. A computer 11 for a Discount Administration Process (DAP) holds the consumer database and the promotion discounts which have been determined. The DAP computer 11 is also the ultimate repository of the additional consumer information from the responses from the identified consumers to the inverted promotion. The DAP computer 11 is connected to a Discount Administration Process Advertising Server (DAPAS) 14 by which the consumers receive advertising and are provided with notices of the promotion discount(s). The notice informs the selected consumer that the discounts exist and that offer of the discounts may be terminated without some action on the part of the consumer. The DAP 11 and the DAPAS 14 may be operated by the entity offering the discounts or by a third party on behalf of one or more of such entities. One such example of a third party operator is described in the previously cited U.S. application Ser. No. 09/191,591.

The DAPAS 14 is connected to a direct mail server 18 that can be used to generate the direct mailings to the selected customer. An acknowledgment could be required to identify the consumer to keep the promotion discount active. The return of a coupon with the name of the recipient is an example. Alternatively, the direct mail could simply inform the consumer of the time when the inverted promotion expires. Similarly, if the selected consumer responds to the automated telephone attendant, the response (even the simple act of demonstrably listening to the promotion with no selection required) itself might be the required acknowledgment. Alternatively, an acceptance of the offer might be required. If the notice is accessible through a store kiosk, then the consumer's acknowledgment of the promotion or even the fact that the consumer visited the kiosk and may possibly have viewed the promotion notification is sufficient.

For electronic communication with the consumers, the DAPAS 14 is connected to the Internet. The consumers use their computers 10, which may be standard personal computers, the emerging so-called network computers, computer/TV devices designed specifically to operate over the Internet, such as WebTV or NetPC devices, or other data entry systems which permit two-way communication over the Internet (generally via e-mail or a web browser), to access the Internet through a computer server 12 of an Internet service provider (ISP). The ISP server 12 is connected to the Internet, a network of computers, represented by an Internet computer 13. The DAPAS 14 can direct e-mail with a notice of the promotion to the selected consumer. A simple e-mail response from the consumer is an effective acknowledgment.

If the promotion is posted on a webpage by the DAPAS 14, then the consumer can browse through the promotions available to him or her at the website by his or her computer 10. Since each consumer logs in through an identifier, the target of the promotion is known. Besides being hosted on the DAPAS 14, the DAPAS 14 may interact with a remote Web host which in turn interacts with the consumer. If the consumer's identifier is created through a particular company's loyalty card program, the consumer can be directed to a website operated by that company, which in turn interacts with DAPAS 14. An acknowledgment by the selected consumer might be the act of browsing through the webpage or a positive response to accept the promotion offer might be required. In accordance with the present invention, any scheduled cancellation of the promotion is held in abeyance to allow the consumer to receive the benefits of the promotion in exchange for receiving the promotion. The consumer may be offered an opportunity to delay the termination of the inverted promotion. For example, an inverted promotion due to expire on one day may have its termination delayed so that the consumer can shop at a more convenient time and still receive the benefits of the inverted promotion.

The DAPAS 14 is also connected to a DAP telephone server 15, which operates as an automated telephone attendant. The server 15 is connected to the telephone system 16 and ordinary telephone sets 17 of the consumers. By calling in and identifying himself, a consumer can find out the promotions available to him through the server 15.

Figure 2:
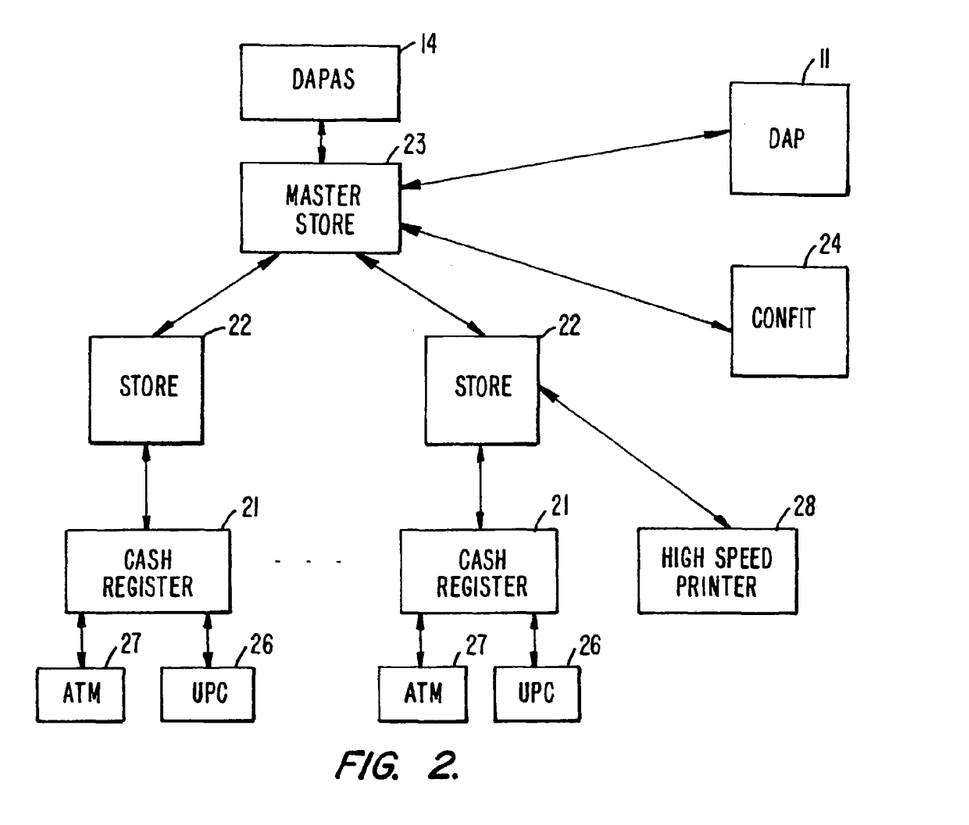
FIG. 2 is a block diagram of a representative retail computer network which can provide promotional offers to its customers in accordance with the present invention.

Finally, the notice might be posted on a retailer's network to which the consumer might access through a designated terminal, such as a kiosk, at one of the retailer's stores. FIG. 2 illustrates the general organization of the point-of-sale operation, i.e., a large store chain, for goods (and services). The store, e.g., a supermarket, typically operates with electronic cash registers 21, essentially computers which record each item sold, calculate the sales totals, prints the receipt, and so forth. Each cash register 21 is often connected to a Universal Product Code (UPC) scanner 26 and/or an Automated Teller Machine (ATM) reader 27. The UPC scanner 26 identifies bar codes on the products to the cash register 21. The ATM reader 27 reads the magnetically encoded account number of a credit/debit/smart card that has been issued by some financial institution, such as a bank, or a store-issued loyalty card, belonging to a consumer. Some cards may also encode their identification number as a bar code which is read by the UPC scanner. The ATM reader 27 also typically accepts typed-in, or otherwise entered, private information, such as a personal information number (PIN), to securely identify the card holder. The store loyalty cards, which can be used to uniquely and anonymously identify their customers, are generally read by the UPC scanner 26 or possibly a magnetic code reader, such as the ATM reader 27.

Any combination of notification mechanisms may be used, possibly with a view towards minimizing the costs of the notification mechanisms. For example, a customer who has a history of visiting a web site does not require expensive direct mail notification.

The cash registers 21 and the kiosk 28 are connected to a store computer 22, which maintains the centralized inventory, pricing and discount information of the store. In turn, the store computer 22 is connected via a network to a master store computer 23. The master store computer feeds pricing information to many store computers 22 and acts as a clearinghouse for a variety of distribution, inventory and other information used in store operations. In this network, the master store computer 23 might hold the consumer database and the promotion discounts that have been determined. The computer 23 is also the ultimate repository of the additional consumer information from the responses from the identified consumers to the inverted promotion for the store. Alternatively, the store computers 22 might act for distributed or localized promotions. Of course, there can be multiple levels for store computers 22 depending upon the size of the retail operation. Naturally, nationwide store chains are likely to have many more computers and computer interconnections. Once the promotion discount is entered into the master store computer 23 or its equivalent, consumers may take their discounts on the specified products.

According to the present invention, the consumer may discover some or all the discounts available to him or her at the kiosk 28. Upon identification of the consumer, the kiosk displays the promoted discounts on a screen or simply prints them out for the consumer. Such might be sufficient to hold any cancellation of a discount in abeyance. In one specific example, the consumer simply swipes his or her loyalty card through a reader and a high speed printer at the kiosk 28 prints out a list of inverted promotions. Alternatively, the kiosk 28 might require some response from the consumer for a promoted discount before the cancellation is terminated.

Then again, a handheld scanner could be used to display the inverted promotion to the consumer as he scans an item, or an audio device that reacts to the consumer's loyalty card can inform the consumer of the promotion as she walks past the device. In these examples, identification of the consumer can again be direct or be limited direct.

The present invention is readily adaptable to current retail store network systems. Currently, pricing in the stores of large chains is often implemented in following manner: For normal pricing, there is a shelf price stored in a table_S in the store network system. For the store's loyalty card members, there is a loyalty card price stored in a table_L. A consumer who presents a loyalty card receives the price in table_L on a given item (the table is effectively indexed by the UPC of the item). If the consumer has no loyalty card, he or she receives the price in the table_S. If there is no special card price on an item, there is simply no entry in the table_L, only an entry in the table_S. A problem exists in such systems if an inverted promotion system is simply added to the existing store network system. Upon a query to the computer server handling inverted promotions, the inverted promotion must always override an entry in the table_L on systems in common use. However, if there is no entry in the table_L, the inverted promotion can not be extended to the consumer.

In accordance with the present invention, there is always a table_L entry, even if there is no loyalty card price. When there is no loyalty card price, the table_L entry is simply initialized to 0% off (or 0 cents off). This allows for four possible discount possibilities: a loyalty card price with no inverted promotion (table_L has a non-0 entry and there is no inverted promotion override for the consumer); no loyalty card price with an inverted promotion (table_L has 0 entry and there is an inverted promotion override); no loyalty card price nor inverted promotion; or both loyalty card price and inverted promotion (in this case, the best offer is the one given to the customer). As a result, inverted promotions can coexist with existing loyalty card pricing policies of the store, and still allow for the possibility of a third tier of pricing without disrupting store loyalty card pricing practices.

When the computer server handling the inverted promotions is down, crashed, or otherwise unresponsive to an inverted promotion query, the consumer cannot receive the special discount or price of his or her inverted promotion. In accordance with the present invention, the consumer is made whole on the next shopping trip to the store as follows: The inverted promotion price P offered to the consumer and the actual (higher) price P' paid by the consumer (from the retail store transaction log analyzed after the fact) are known. Therefore, the consumer is owed the amount (P'−P). A rebate of (P'−P) is installed in the consumer's account, and the consumer receives the rebate automatically (no customer action, such as clipping a coupon or clicking on a website icon is needed). If the consumer complains at the time of the computer server crash, the store manager can give the consumer an immediate cash rebate, and then cancel the pending inverted promotion to avoid having the consumer receive the same rebate twice.

Outside of the retail store network illustrated in FIG. 2, the master store computer 23 is connected to the computers 24 of financial institutions (FIT). The FIT computers 24 verify and process the financial transactions involving credit, debit and smart cards, including those at the store register 21. As explained above, these financial account numbers might be used for the consumer identifiers. Besides the connections to the FIT computers 24, the master store computer 23 is connected to a DAP computer 11 and its DAPAS 14. Besides the retailer's network, these connections provide several avenues of promotion and for the consumer to find out the available promotions.

On the other hand, the described inverted promotion system could be operated entirely within the retail network. The operations of the DAP computer 11 and the master store computer 23 might be merged so that the retailer has control over the operations of the inverted promotions and to ensure the protection of the retailer's proprietary database of consumers.

The adaptability of the present invention to changing market conditions should be apparent. For example, while an inverted promotion is directed to a specific consumer for a specific item (or service), the location where the benefits of the promotion may be received may as wide or as focused as desired. If the data of the inverted promotion is stored in a central master store computer, such as shown in FIG. 2, the beneficial locations may be a collection of stores or only a single store, depending upon the programming of the central computer. The inverted promotion notice to the consumer informs the location of the store(s) where the specified item might be obtained at the special price.

Information supplemental to inverted promotions can be sent to the consumers. For instance, the accumulated consumer database may indicate that a specific consumer has certain preferences, such as meatloaf. Instead of, or perhaps in addition to, an inverted promotion on meatloaf, the retailer might send the consumer meatloaf recipes to stimulate the purchase of meatloaf. The supplemental information might be passed to the consumer by the methods described previously, such as regular mail, e-mail, or simply posted on the retailer's website for viewing by the consumer when he or she logs on to the website. Typically the supplemental information is sent by the same means as used for the inverted promotion notice.

The supplemental information might be sent to the consumer after the consumer receives the benefit of the inverted promotion. Again, it does not matter whether the consumer acknowledged the promotion or not before purchasing the promoted item at the special price. The information might credit the entity responsible for the inverted promotion to create customer goodwill. For example, the supplemental information might say, "Your purchase of Product X for the special price of $1.00 was brought to you by Company Y." Such supplemental information is especially useful if the consumer had not seen the inverted promotion and therefore not seen the promoter of the inverted promotion before making the purchase. Again the supplemental information is typically sent by the same means as used for the inverted promotion notice.

Inverted promotions may be combined with different levels of consumer identification. For example, rather than only an inverted promotion on crackers, a supermarket retailer may decide to combine the inverted promotion on crackers with a straightforward promotion on cheese. Having responded to the inverted promotion on a specific item of crackers, the consumer receives a special price on a specific item of cheese. In this example, both promotions require only a limited direct identification, i.e., the consumer's loyalty card account. Of course, complete direct identification is acceptable also if the consumer is not concerned about privacy.

The promotions need not come from the same source; more than one merchant might collaborate for combined promotions toward a consumer. One example where different levels of identification are possible is the following: A high-end supermarket might make an inverted promotion to selected consumers for caviar over, say, the supermarket's website. Attached to this inverted promotion might be another promotion from a financial institution for a credit card, as an example. Note the acceptance or response to the caviar typically requires only a limited direct identification, the supermarket's loyalty card or the KEY account number referred to previously. On the other hand, acceptance of the credit card requires complete identification. As described in the previously mentioned U.S. Pat. No. 6,009,411, the present invention permits the separation of identification to be maintained. One merchant, the supermarket, has only limited direct identification of the consumer, while the other merchant, the financial institution has complete identification.

A consumer could be given an inverted promotion by a vendor cooperating with a retailer, such as a special rate on an investment account (which could be advertised on the vendor or the retailer's advertising channels or both). This inverted promotion may be identified based on an analysis of the retailer's data—for example, consumers who purchase pre-sweetened cereal may be interested in a college savings account because they likely have young children. Upon acceptance of this promotion, a normal promotion such as a $50 discount on the next shopping trip at the retailer, or a favorite item for free could be given. The initial inverted promotion could also identify the specific subsequent normal promotion at the time of the notification of the inverted promotion.

It should be noted that both the inverted promotion and the normal promotion can both be given using limited direct identification of the consumer. Thus the consumer may remain anonymous to the retailer and/or the vendor. As an example of double anonymity, a consumer may be identified as a likely car buyer and an inverted promotion of a free item at the car dealer is given. At the same time, the consumer could be informed that upon completion of a test drive, a free gallon of their favorite ice cream will be available to them the retailer. Only limited direct identification is used at both the car dealer and the retailer and the consumer's identity is completely protected.

An inverted promotion, the Web and limited direct identification may be combined. A retailer, such as a supermarket, might allow a consumer to purchase items, including those under an inverted promotion, through a website. As explained above, the purchase might be through a credit or debit card; however, the retailer only has access to the consumer's limited direct identification, i.e., the account number. The consumer can access the status of the order through the retailer's website and pick up the purchased items when the status indicates the order has been completed.

Up to now, the inverted promotion has been described in terms of discounts or special prices for the promoted items directed toward the consumer. It should be understood that cash or points might be obtained by the consumer in an inverted promotion. For example, rather than a lower price, the consumer might receive cash, the difference between the normal shelf price and the special inverted promotion price, at the retailer checkout counter. Likewise, points might be accumulated for the acquisition of special items or prizes, or for later redemption in discounts or cash. An inverted promotion could also consist of a free sample or a cash discount off of a collection of items, such as an entire shopping basket, or even an outright cash remuneration.

A safety feature in the implementation of inverted promotions according to the present invention is a "promotion firewall." The computer server handling the inverted promotions can provide a list of items which are being promoted and the maximum possible discount for the item to any identified consumer. For example, if an item is offered at $1.00 to one customer and $0.50 to another, the $0.50 price is the maximum possible discount under the promotion. Many benefits are obtained. This list can be used to easily verify that the promotions being communicated to the customer are plausible and reduces dependence on the correctness of the notification delivery mechanisms for the inverted promotion being 100% accurate. Secondly, the firewall list assists customer support functions. If a consumer claims that he is due a specific promotion, this list may be consulted in the store to verify that such a promotion is indeed currently being offered and the maximum possible discount due the consumer can be proffered. Thirdly, the list verifies that the set of inverted promotions offered at the point of sale is in agreement with retailer or manufacturer business practices. This allows the software which calculates the inverted promotion to be trusted even if the reliability of the software is questioned.

Inverted promotions may be arranged in a logical presentation to the consumer. As an example, the current set of inverted promotions can be listed by aisle in a supermarket, making it easy for the customer to obtain the inverted promotions in a single pass through the store. This logical presentation is accomplished by linking presentation data, such as the planogram for the store aisle layout to the inverted promotion set. While the foregoing is a complete description of the embodiments of the invention, it should be evident that various modifications, alternatives and equivalents may be made and used. Accordingly, the above description should not be taken as limiting the scope of the invention which is defined by the metes and bounds of the appended claims.

What is claimed is:

1. A computer program product comprising non-transitory computer readable medium containing computer executable code that when executed by a computer performs operations comprising:
   storing a first table of prices for a plurality of items for all consumers;
   storing a second table of prices for a first set of items selected from the plurality of items, wherein the second table is associated with a first set of consumers;
   storing a third table of prices for a second set of items selected from the plurality of items, wherein the third table is associated with a second set of consumers;
   providing at least one of the following:
      a price for a first set selected item from the second table to the first set of consumers when an entry in the second table for the first set selected item is non-zero;
      a price for a second set selected item from the third table to the second set of consumers when an entry in the second table for the second set selected item is zero;
      a lower price of two prices for an item having non-zero entries in both second and third tables to the second set of selected consumers;
      a price for an item from the first table to the second set of consumers when there is no entry for the item in the second table; and
      a price for an item from the first table to consumers who are not members of the first and second set of consumers;
   whereby different prices for items can be provided to the first and second sets of selected consumers.

2. The computer program product of claim 1 wherein the zero entries in the second table comprise entries of "0" in the second table.

3. The computer program product of claim 1 further comprising the step of identifying the first set of selected consumers by a store loyalty card.

4. The computer program product of claim 3 further comprising the step of identifying the second set of selected consumers by a second loyalty card.

5. The computer program product of claim 4 further comprising combining the first set of selected consumers with the second set of consumers.

6. A computer program product comprising non-transitory computer readable medium containing computer executable code that when executed by a computer performs operations comprising:
  storing a first table of prices for a plurality of items for all consumers;
  storing a second table of discounted prices for a first set of items selected from the plurality of items, wherein the second table is associated with a first set of consumers;
  storing a third table of discounted prices for a second set of items selected from the plurality of items, wherein the third table is associated with a second set of consumers;
  providing at least one of the following:
    a discounted price for a first set selected item from the second table to the first set of consumers when an entry in the second table for the first set item is non-zero;
    a discounted price for a second set selected item from the third table to the second set of consumers when an entry in the second table for the second set item is zero;
    a lower price of two discounted prices for an item having non-zero entries in both second and third tables to the second set of selected consumers;
    a price for an item from the first table to the second set of consumers when there is no entry for the item in the second table; and
    a price from the first table to consumers who are not members of the first and second set of consumers;
  whereby different discounted prices can be provided to the first and second set of selected consumers.

7. The computer program product of claim 6 wherein the zero entries in the second table comprise entries of "0" in the second table.

8. The computer program product of claim 6 further comprising the step of identifying the first set of selected consumers by a store loyalty card.

9. The computer program product of claim 8 further comprising the step of identifying the second set of selected consumers by a second loyalty card.

10. The computer program product of claim 9 further comprising combining the first set of selected consumers with the second set of consumers.

11. For a computer network system having a first table of prices for a plurality of items for all consumers and having a second table of prices for a first set of items selected from the plurality of items for a first set of consumers, a method for providing different prices to different sets of consumers comprising:
  storing a third table of prices for a second set of items selected from the plurality of items,
  wherein the third table is associated with a second set of consumers;
  providing, by a computer processor, at least one of the following:
    a price for a first set selected item from the second table to the first set of consumers when an entry in the second table for the first set selected item is non-zero;
    a price for a second set selected item from the third table to the second set of consumers when an entry in the second table for the second set item is zero;
    a lower price of two prices for an item having non-zero entries in both second and third tables to the second set of selected consumers;
    a price for an item from the first table to the second set of consumers when there is no entry for the item in the second table; and
    a price for an item from the first table to consumers who are not members of the first and second set of consumers;
  whereby different prices for items can be provided to the first and second set of selected consumers.

12. The computer program product of claim 11 wherein the zero entries in the second table comprise entries of "0" in the second table.

13. The method of claim 11 further comprising identifying the first set of selected consumers by a store loyalty card.

14. The method of claim 13 further comprising identifying the second set of selected consumers by a second loyalty card.

15. The method of claim 14 further comprising combining the first set of selected consumers with the second set of consumers.

16. For a computer network system having a first table of prices for a plurality of items for all consumers and having a second table of prices for a first set of items selected from the plurality of items for a first set of selected consumers, a method of providing prices to different sets of consumers comprising:
  setting entries in the second table for all other items in the first table from the plurality of items to zero;
  storing a third table of prices for a second set of items selected from the plurality of items,
  wherein the third table is associated with a second set of consumers;
  providing, by a computer processor at least one of the following:
    a price for a first set selected item from the second table to the first set of consumers when an entry in the second table for the first set selected item is non-zero;
    a price for a second set selected item from the third table to the second set of consumers when an entry in the second table for the second set selected item is zero;
    a lower price of two prices for an item having non-zero entries in both second and third tables to the second set of selected consumers;
    a price for an item from the first table to the second set of consumers when there is no entry for the item in the second table; and
    a price the first table to consumers who are not members of the first and second set of consumers from;
  whereby different prices for items can be provided to the first and second sets of selected consumers.

17. The method of claim 16 wherein said zero entries comprise entries of "0" in said second table.

18. The method of claim 16 further comprising identifying the first set of selected consumers by a store loyalty card.

19. The method of claim 18 further comprising identifying the second set of selected consumers by a second loyalty card.

20. The method of claim 19 further comprising combining the first set of selected consumers with the second set of consumers.

21. A computer system for providing different prices for items to different sets of selected consumers, comprising:
   at least one processor:
   a computer-readable memory having computer-executable code, the computer-readable memory coupled to the at least one processor, wherein the at least one processor when executing the computer-executable code performs operations comprising:
   storing a first table of prices for a plurality of items for all consumers;
   storing a second table of prices for a first set of items selected from the plurality of items, wherein the second table is associated with a first set of consumers;
   storing a third table of prices for a second set of items selected from the plurality of items, wherein the third table is associated with a second set of consumers;
   providing at least one of the following:
      a price for a first set selected item from the second table to the first set of consumers when an entry in the second table for the first set selected item is non-zero;
      a price for a second set selected item from the third table to the second set of consumers when an entry in the second table for the second set selected item is zero;
      a lower price of two prices for an item having non-zero entries in both second and third tables to the second set of selected consumers;
      a price for an item from the first table to the second set of consumers when there is no entry for the item in the second table; and
      a price for an item from the first table to consumers who are not members of the first and second set of consumers;
   whereby different prices for items can be provided to the first and second sets of selected consumers.

22. The computer program product of claim 21 wherein the zero entries in the second table comprise entries of "0" in the second table.

23. The method of claim 21 wherein the first set of selected consumers is identified by a store loyalty card.

24. The method of claim 23 wherein the second set of selected consumers is identified by a second loyalty card.

25. The method of claim 24 further comprising combining the first set of selected consumers with the second set of selected consumers.

* * * * *